United States Patent Office 3,539,464
Patented Nov. 10, 1970

3,539,464
SEQUESTERING AGENT COMPRISING AN AQUEOUS SOLUTION OF A BORATE AND SODIUM α - GLUCOHEPTONATE AND/OR SODIUM β-GLUCOHEPTONATE
James L. Harper, Laurel, Md., and Edward G. Najjar, West Roxbury, Mass., assignors to W. R. Grace & Co., New York, N.Y., a corporation of Connecticut
No Drawing. Filed Sept. 7, 1967, Ser. No. 665,983
Int. Cl. C02b 5/02; C07c 69/34; C11d 7/02
U.S. Cl. 252—181                    11 Claims

ABSTRACT OF THE DISCLOSURE

This invention is directed to a composition useful as a sequestering agent and to the preparation of said composition, said composition consisting essentially of an aqueous solution having a solid content of about 20–80% by weight, said solid consisting essentially of about 30–100 mole percent borate esters of at least one salt selected from the group consisting of sodium α-glucoheptonate and sodium β-glucoheptonate and about 0–70 mole percent of a salt selected from the group consisting of sodium α-glucoheptonate, sodium β-glucoheptonate, and mixtures thereof, all as recited hereinafter.

---

This invention is in the field of the sodium glucoheptonates and borate esters thereof.

Aqueous solutions of mixtures of sodium α-glucoheptonate and sodium β-glucoheptonate are well known in the art, being articles of commerce. These solutions are generally made from glucose by the general procedure of the Kiliani synthesis in which glucose is treated with cyanide (e.g., HCN, NaCN, or KCN) to form a mixture of nitriles (I and II) which are hydrolized to produce a mixture of salts (III and IV). For example, the addition of hydrogen cyanide to an aqueous solution of D-glucose produces a mixture of two epimeric nitriles (I and II) because, in this reaction, a new asymmetric carbon atom is added to the glucose chain:

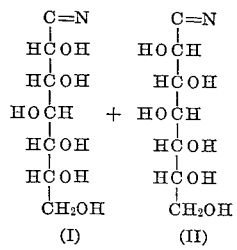

Alkaline hydrolysis (e.g., with sodium hydroxide) of the thus formed solution produces a solution comprising a mixture of salts of two epimeric monobasic (monoprotic) acids:

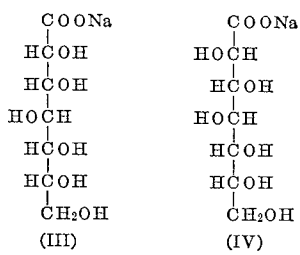

Formula III, supra, is the formula of sodium α-glucoheptonate (sodium D-glycero-β-D-gulo-heptonate), and Formula IV, supra, is the formula of sodium β-glucoheptonate (sodium D-glycero-D-ido-heptonate).

In summary, this invention is directed to a composition of matter useful as a sequestering agent, said composition consisting essentially of an aqueous solution having a solid content of about 20–80% by weight, said solid consisting essentially of about 30–100 mole percent of borate esters of at least one salt selected from the group consisting of sodium α-glucoheptonate and sodium β-glucoheptonate, and about 0–70 mole percent of a sodium glucoheptonate selected from the group consisting of sodium α-glucoheptonate, sodium β-glucoheptonate and mixtures thereof, said solution being free of a solid phase within the temperature range of about 5–100° C.

In preferred embodiments of this invention:
(1) The aforesaid composition has a pH of about 5–9 at 20° C.;
(2) Said composition has a solid content of about 35–70% by weight; and
(3) The solid component of said composition consists essentially of;
   (a) about 35–100 mole percent of borate esters of at least one salt selected from the group consisting of sodium α-glucoheptonate and sodium β-glucoheptonate; and
   (b) about 0–65 mole percent of a glucoheptonate selected from the group consisting of sodium α-glucoheptonate, sodium β-glucoheptonate, and mixtures thereof; and
(4) The mole ratio of the total, esterified plus free, sodium α-glucoheptonate to the total, esterified plus free, sodium β-glucoheptonate of said composition is about 1–2.4:1.

Another embodiment of this invention is directed to a process for preparing a first aqueous solution useful as a sequestering agent, said process comprising;

Adding a borate source selected from the group consisting of boric acid, sodium tetraborate, sodium metaborate, and mixtures of two or more members of said group to an aqueous composition, said aqueous composition being an aqueous solution or an aqueous slurry, said composition having a solid content of about 30–70% by weight, said solid consisting essentially of at least one salt selected from the group consisting of sodium α-glucoheptonate and sodium β-glucoheptonate, said borate source being added at a rate to provide about 1.62–10.8 grams of boron, calculated as B, per gram mole of total sodium glucoheptonate, sodium α-glucoheptonate plus sodium β-glucoheptonate, present in said second solution, and recovering the thus formed first aqueous solution.

Another preferred embodiment of this invention is directed to a process "Process A" for preparing a first aqueous solution useful as a sequestering agent, said Process A comprising:

(a) Forming a second aqueous solution by adding a borate source selected from the group consisting of boric acid, sodium tetraborate, sodium metaborate, and mixtures of at least two members selected from the group consisting of boric acid, sodium tetraborate, and sodium metaborate to an aqueous composition, said aqueous composition being an aqueous solution or an aqueous slurry, while agitating said aqueous composition and maintaining the temperature thereof within the range of about 20–100° C., said aqueous composition having a pH of about 9–11 at 20–25° C. and a first solid content of about 30–70% by weight, said first solid consisting essentially of at least one salt selected from the group consisting of sodium α-glucoheptonate and sodium β-glucoheptonate, said borate source being added at a rate to provide about 1.62–10.8 grams of boron, calculated as B, per gram mole of total sodium glucoheptonate, sodium α-glucoheptonate plus sodium β-glucoheptonate, present in said aqueous composition;

(b) Forming a first aqueous solution, said first aqueous solution having a solid content of about 20–80% by weight, said solid consisting essentially of: (i) about 30–100 mole percent of borate esters of at least one salt selected from the group consisting of sodium α-glucoheptonate and sodium β-glucoheptonate; and (ii) about 0–70 mole percent of sodium glucoheptonate selected from the group consisting of sodium α-glucoheptonate, sodium β-glucoheptonate, and mixtures thereof, by adjusting the solid content of the aforesaid second aqueous solution to about 20–80% by weight, said first solution being substantially free of a solid phase at about 5–100° C.;

(c) Recovering said first aqueous solution.

In other preferred embodiments of this invention:

(1) The first aqueous solution of Process A has a pH of about 5–9 at 20–25° C.;

(2) The borate source used in Process A is boric acid;

(3) The borate source used in Process A is sodium tetraborate;

(4) The borate source used in Process A is sodium metaborate;

(5) The first aqueous solution of Process A has a solid content of about 35–70% by weight; and (6) The borate source is added to the aqueous composition of Process A at a rate to provide about 3.25–9.0 (or 4–6) grams of boron, calculated as B, per gram mole of total sodium glucoheptonate, sodium α-glucoheptonate plus sodium β-glucoheptonate, present in said aqueous composition.

Aqueous solutions of mixtures of sodium α-glucoheptonate and sodium β-glucoheptonate are articles of commerce. Solid sodium α-glucoheptonate is also an article of commerce, being prepared by crystallizing sodium α-glucoheptonate from aqueous solutions of mixtures of sodium α-glucoheptonate and sodium β-glucoheptonate. Such aqueous solutions (mixtures of the α- and β-salts) are, as noted supra, generally prepared by procedures based upon the Kiliani synthesis. While sodium α-glucoheptonate is readily crystallized from such solutions, sodium β-glucoheptonate cannot be obtained in crystalline form from such solutions by any means known to the art. Evaporating, or concentrating, such solutions, after substantially all of the sodium α-glucoheptonate has been crystallized therefrom, produces a thick viscous syrup, but no crystals of sodium β-glucoheptonate crystallize therefrom. Still further, evaporation (substantially to dryness) produces lumps, or chunks, or a hydroscopic, amorphous, glass-like solid—sodium β-glucoheptonate—which is exceedingly difficult or impossible to handle on a commercial scale.

In consequence of such behavior, aqueous solutions of sodium β-glucoheptonate represent an unwanted or "distress" by-product of the preparation of crystalline sodium α-glucoheptonate. Although such solutions of sodium α-glucoheptonate can be used as sequestering agents, their viscous nature renders them unsatisfactory because, at concentrations above about 45–50% sodium β-glucoheptonate, such solutions are too viscous to be handled readily and below such concentrations their high water content makes it unduly costly to ship them.

Likewise, aqueous solutions of mixtures of sodium α-glucoheptonate and sodium β-glucoheptonate can be used as sequestering agents, but they must be shipped with a high water content (e.g., a solid content of about 20–35% by weight or lower) because sodium α-glucoheptonate will precipitate (or crystallize) from such solutions on cooling during shipment, on storage, or in lines in plants where such solutions are used.

We have made the surprising and completely unobvious discovery that aqueous solutions of sodium α-glucoheptonate, solutions of sodium β-glucoheptonate, and solutions of mixtures of sodium α-glucoheptonate and sodium β-glucoheptonate can be stabilized (i.e., converted to a form from which a solid phase does not form on cooling such solutions having a solid content of up to about 35–60% by weight, or higher, to temperatures as low as about 0–50° C.) by the process of our invention.

We have also made the surprising and completely unobvious discovery that the viscosity of aqueous solutions of sodium β-glucoheptonate can be controlled by the process of our invention. By this we mean that aqueous solutions prepared by the method of our invention and having a solid content of about 50–75% by weight, said solid consisting essentially of about 15–100 mole percent borate esters of sodium β-glucoheptonate and about 0–85 mole percent sodium β-glucoheptonate have a viscosity low enough to make such borate ester-containing solutions convenient to ship, pump, and use on a commercial scale.

It is believed that the following discussion explains the chemical nature of the borate esters of sodium β-glucoheptonate; however, our invention is completely independent of and in no way dependent upon such theory whether or not the theory should prove correct.

An aqueous solution containing the borate and glucoheptonate anions (either α- or β-glucoheptonate anions, or mixtures thereof) would undoubtedly be a complex equilibrium mixture which would contain the following species;

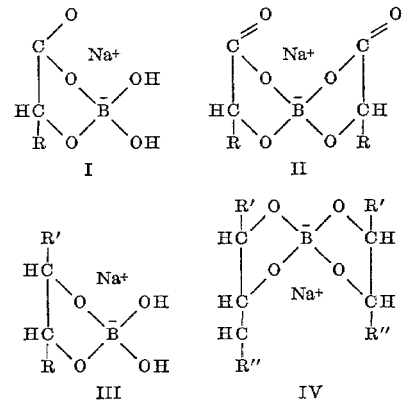

wherein R is the residue of the sodium glucoheptonate structure and R′ and R″ also portions of sodium glucoheptonate residues (one of which contains the carboxyl groups).

Note that structures of the type II and IV could be mixed esters, i.e., V, below:

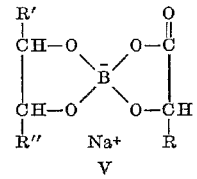

The following non-limiting examples illustrate but do not limit the scope of our invention.

EXAMPLE I

To 70.66 kilograms of a first aqueous solution having a solid content of about 40% by weight, said solid consisting essentially of sodium β-glucoheptonate was added 2.95 kilograms of pulverulent boric acid ($H_3BO_3$) while stirring (agitating) said first solution and while maintaining the temperature of said solution within the range of about 25–50° C. The total solid content of resulting borate-treated solution was about 42.5% by weight. Said solution had a specific gravity of 1.25. Said solution was labeled "Solution A."

The pH of Solution A was about 6 at 25° C., and the specific gravity of said solution was 1.25.

No crystals or solid phase formed in a first sample of Solution A when said first sample was stored for several weeks at a temperature of about 5–8° C.

No crystals or solid phase formed in a second sample of said solution when said second sample was stored for several weeks at a temperature of about 20–30° C.

EXAMPLE II

The solid content of a portion of Solution A was adjusted to about 25% by weight by adding water thereto. The resulting solution was labeled "Solution B."

Solution B had a pH of about 6.3 at 25° C.

No crystals or solid phase formed in samples of Solution B which were stored for several weeks at about 5–8° C. and 20–30° C., respectively.

EXAMPLE III

The solid content of a sample of Solution A was adjusted to about 50% by weight of evaporating water from said sample by boiling said sample at atmospheric pressure. The resulting solution was labeled "Solution C."

Solution C had a pH of about 6 at 25° C.

No crystals or solid phase formed in samples of Solution C which were stored for several weeks at about 5–8° C. and 20–30° C., respectively.

EXAMPLE IV

The solid content of a sample of Solution A was adjusted to about 75% by weight of evaporating water from said sample in a rotary evaporator (Büchi Rotavapor) under a pressure of about a pound per square inch absolute. The lower portion of a rotating flask in which the sample of Solution A was contained during such evaporation was immersed in a bath of boiling water. The resulting product, a clear liquid having a solid content of about 75% by weight, was labeled "Solution D."

Solution D had a pH of about 5.8 at 25° C.

Substantially no crystals or solid phase formed in samples of Solution D which were stored for several weeks at temperatures of about 5–8° C. and 20–30° C., respectively.

EXAMPLE V

A solution having a solid content of about 30% by weight was prepared by dissolving 30 grams of solid sodium α-glucoheptonate in 70 milliliters of distilled water. A 5.5 gram portion of sodium metaborate was added to the aforesaid solution of sodium α-glucoheptonate while maintaining said solution at about 30–40° C. The resulting solution, having a solid content of about 34% by weight was labeled "Solution E."

Substantially no crystals formed in samples of Solution E which were stored for several weeks at temperatures of about 5–8° C. and 20–30° C., respectively.

EXAMPLE VI

To 500 grams of an aqueous composition (slurry) having a solid content of about 45% by weight, said solid consisting essentially of a mixture of sodium α-glucoheptonate and sodium β-glucoheptonate in the proportions of about 60% sodium α-glucoheptonate and about 40% sodium β-glucoheptonate was added 23 grams of boric acid while maintaining the temperature of the solution within the range of about 50–60° C. The resulting solution having a solid content of about 47% by weight and a specific gravity of about 1.36 was labeled "Solution F."

Substantially no crystals formed in samples of Solution F which were maintained for several weeks at about 5–8° C. and 20–30° C., respectively.

EXAMPLE VII

The general procedure of Example VI was repeated. However, in this instance, the boric acid of Example VI was replaced with 34 grams of sodium tetraborate (borax, $Na_2B_4O_7 \cdot 10H_2O$). The resulting solution having a solid content of about 48% by weight was labeled "Solution G."

Substantially no crystals formed in samples of Solution G which were maintained for several weeks at about 5–8° C. and 20–30° C., respectively.

EXAMPLE VIII

A 0.25 gram portion of Solution A from Example I, supra, was dissolved in about 70 milliliters of water and a 3 gram portion of sodium hydroxide was added to the resulting solution which was then diluted to 100 milliliters with water and labeled "Solution X." A 0.3 gram portion of metallic aluminum was dissolved in Solution X which was then allowed to stand for a first period of about 72 hours at about 70° C. in an open container. The volume of the solution was readjusted to 100 milliliters (by adding water), a 0.7 gram portion of aluminum was dissolved therein, and the thus treated solution was allowed to stand for a second period of about 24 hours at about 70° C. At the end of this period the solution was clear, free of turbidity and no precipitate could be detected in the container.

EXAMPLE IX

The general procedure of Example VIII, supra, was repeated; however, in this instance, Solution A was omitted (i.e., the sequestering agent of the instant invention was not added). A substantial amount of precipitate was observed in the container at the end of the second period.

Results substantially identical to those obtained in Example VIII were obtained where Solution A of said Example VIII was replaced with substantially equivalent amounts of Solutions B, C, D, E, F, and G. By "substantially equivalent amounts of Solutions B, C, D, E, F, and G" is meant that quantities of each of said solutions which has a solid content of about 0.09–0.11 grams.

The components of any solid (including a dissolved solid) will always add up to 100 mole percent. For example, a dissolved solid consisting essentially of 15 mole percent borate esters of sodium glucoheptonate will also consist essentially of 85 mole percent sodium glucoheptonate, and a dissolved solid consisting essentially of 90 mole percent borate esters of sodium glucoheptonate will also consist essentially of 10 mole percent sodium glucoheptonate.

As used herein the term "sequestering agent" means a material (or mixture of materials) which will cause the formation of soluble complexes of metal ions in the presence of chemicals that would normally react with, or combine with, said ions to form insoluble products (precipitates).

A sequestering agent, by forming soluble complexes with metal ions, can also dissolve many slightly soluble substances, e.g., $CaSO_4$, $BaSO_4$, and the like.

The composition of the instant invention is especially useful as a complexing or sequestering agent in the alkaline etching of metallic aluminum because, unlike such well known sequestering agents as EDTA and NTA, the composition made by the process of the instant invention is highly effective in preventing the precipitation of $Al_2O_3$ (probably as hydrated aluminum oxide—the so-called aluminum hydroxide) in such alkaline etching baths.

Said composition is also an excellent sequestering agent for preventing the formation of precipitates in strongly alkaline baths which are frequently used in washing operations. For example, in washing bottles in the dairy, soft drinks, and brewing industries, bottles are washed with the use of hot solutions of sodium hydroxide, approximating 3% in strength. As the water used in washing is ordinary tap water containing calcium and magnesium in the amounts present in ordinary water supplies, there is a tendency for precipitates to deposit on both the wash machinery and the bottles being washed. This deposition (milkstone) apparently takes place to the greatest extent in the first rinse tank, where, in customary operation, the pH of the rinse water is about 11.5, sometimes a little below 11.5, more often between 11.5 and 12. Precipitation results in the formation of scale on the machinery, plugging the spray nozzles and discoloration of the bottles or other objects being washed.

Many sequestering agents, such as the glassy phosphates, tripolyphosphate, NTA (nitrilotriacetic acid or salts thereof), and EDTA (ethylene diaminetetraacetic acid or salts thereof), which are useful in inhibiting the formation of films or precipitates with less alkaline detergents, as, for example, those used in domestic or commercial dishwashers, are ineffective with these more highly alkaline solutions, presumably because of hydrolysis.

The borate sources (boric acid, sodium tetraborate, sodium metaborate, and all possible mixtures thereof) can be added to sodium glucoheptonate solutions while said borate sources are in the solid phase, are suspended as aqueous slurries, or are dissolved and thus present as aqueous solutions. However, because of its low solubility in water, it is generally not economically practical to add boric acid as a solution.

All pressures reported in this specification are absolute pressures unless otherwise defined where used.

What is claimed is:

1. A composition useful as a sequestering agent prepared by a process comprising:
  (a) forming an aqueous solution by adding a borate source selected from a first group consisting of boric acid, sodium tetraborate, sodium metaborate, and mixtures of at least two members of said first group to an aqueous system selected from a second group consisting of aqueous solutions and aqueous slurries of at least one member selected from a third group consisting of sodium α-glucoheptonate and sodium β-glucoheptonate while agitating said aqueous system and maintaining the temperature thereof within the range of about 20–100° C., said aqueous system having a sodium glucoheptonate content of about 30–70% by weight, said borate source being added at a rate to provide about 1.62–10.8 grams of boron, calculated as B, per gram mole of sodium glucoheptonate;
  (b) forming said composition by adjusting the solid content of the aforesaid aqueous solution to about 20–80% by weight, said composition being an aqueous mixture which is substantially free of a solid phase at about 0° C.; and
  (c) recovering said composition.

2. The composition of claim 1 in which the pH is about 5–9 at about 20–25° C.

3. The composition of claim 1 in which said composition has a solid content of about 35–70% by weight.

4. The composition of claim 1 in which the sodium glucoheptonate is sodium α-glucoheptonate.

5. A process for preparing a composition useful as a sequestering agent, comprising:
  (a) forming an aqueous solution by adding a borate source selected from a first group consisting of boric acid, sodium tetraborate, sodium metaborate, and mixtures of at least two members of said first group to an aqueous system selected from a second group consisting of aqueous solutions and aqueous slurries of at least one member selected from a third group consisting of sodium α-glucoheptonate and sodium β-glucoheptonate while agitating said aqueous system and maintaining the temperature thereof within the range of about 20–100° C., said aqueous system having a sodium glucoheptonate content of about 30–70% by weight, said borate source being added at a rate to provide about 1.62–10.8 grams of boron, calculated as B, per gram mole of sodium glucoheptonate;
  (b) forming said composition by adjusting the solid content of the aforesaid aqueous solution to about 20–80% by weight, said composition being an aqueous mixture which is substantially free of a solid phase at about 0° C.; and
  (c) recovering said composition.

6. The process of claim 5 in which the sodium glucoheptonate is sodium α-glucoheptonate.

7. The process of claim 5 in which the borate source is boric acid.

8. The process of claim 5 in which the borate source is sodium tetraborate.

9. The process of claim 5 in which the borate source is sodium metaborate.

10. The process of claim 5 in which the composition has a solid content of about 35–70% by weight.

11. The process of claim 5 in which the borate source is added to the aqueous system at a rate to provide about 3.25–9 grams of boron, calculated as B, per gram mole of total sodium glucoheptonate in the aqueous system.

References Cited

UNITED STATES PATENTS

| | | | |
|---|---|---|---|
| 3,039,970 | 6/1962 | Krueger et al. | 252—156 XR |
| 3,105,822 | 10/1963 | Karabinos et al. | 252—156 |
| 3,217,034 | 11/1965 | Karabinos et al. | |

JOHN T. GOOLKASIAN, Primary Examiner

M. E. McCAMISH, Assistant Examiner

U.S. Cl. X.R.

252—156; 260—234